(12) United States Patent
Shao et al.

(10) Patent No.: US 10,571,972 B2
(45) Date of Patent: Feb. 25, 2020

(54) ROTATION SENSOR DEVICE

(71) Applicants: Intel Corporation, Santa Clara, CA (US); Bao Shao, Kunshan (CN); Ze An Xia, Shanghai (CN)

(72) Inventors: Bao Shao, Kunshan (CN); Ze An Xia, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 15/119,222

(22) PCT Filed: Mar. 28, 2014

(86) PCT No.: PCT/CN2014/074251
§ 371 (c)(1),
(2) Date: Aug. 16, 2016

(87) PCT Pub. No.: WO2015/143694
PCT Pub. Date: Oct. 1, 2015

(65) Prior Publication Data
US 2017/0010636 A1    Jan. 12, 2017

(51) Int. Cl.
*G06F 1/16*  (2006.01)
*G06F 1/3218* (2019.01)
*G06F 1/3234* (2019.01)

(52) U.S. Cl.
CPC .......... *G06F 1/1677* (2013.01); *G06F 1/1616* (2013.01); *G06F 1/1681* (2013.01);
(Continued)

(58) Field of Classification Search
CPC .... G06F 1/1677; G06F 1/1616; G06F 1/1618; G06F 1/1681; G06F 1/3218;
(Continued)

(56) References Cited

U.S. PATENT DOCUMENTS 4,442,606 A * 4/1984 Graham .................. G01B 3/56
33/1 N
5,163,228 A * 11/1992 Edwards ................ A61B 5/107
33/1 N
(Continued)

FOREIGN PATENT DOCUMENTS

CN    102037425 A    4/2011
CN    102609036 A    7/2012
(Continued)

OTHER PUBLICATIONS

International Search Report and Written Opinion in International Application No. PCT/CN2014/074251, dated Dec. 31, 2014, 12 pages.
(Continued)

*Primary Examiner* — Nimeshkumar D Patel
*Assistant Examiner* — Tania Courson
(74) *Attorney, Agent, or Firm* — Patent Capital Group

(57) ABSTRACT

Particular embodiments described herein provide for a device that can include a hinge to couple a first housing to a second housing. The hinge can include logic to detect a rotation of the first housing around an axis of the hinge relative to the second housing. The logic may be included in a digital potentiometer integrated within the hinge.

25 Claims, 9 Drawing Sheets

(52) U.S. Cl.
CPC .......... *G06F 1/3218* (2013.01); *G06F 1/3265* (2013.01); *Y02D 10/153* (2018.01)

(58) Field of Classification Search
CPC . G06F 1/3265; G06F 3/04847; Y02D 10/153; E05Y 2900/606
USPC .... 33/1 PT, 1 N, 275 R, 276–279, 281, 282, 33/285, 286, DIG. 21
See application file for complete search history.

(56) References Cited

U.S. PATENT DOCUMENTS

| | | | | |
|---|---|---|---|---|
| 5,263,492 | A * | 11/1993 | Voyce | A61B 5/1071 33/471 |
| RE34,700 | E * | 8/1994 | Suzuki | A61B 5/1071 310/338 |
| 5,594,434 | A * | 1/1997 | McCullough | G01D 5/24404 250/231.13 |
| 5,719,799 | A * | 2/1998 | Isashi | G06F 1/1618 345/169 |
| 5,864,956 | A * | 2/1999 | Dong | G01B 11/26 33/227 |
| 5,887,351 | A * | 3/1999 | Arms | G01B 7/30 33/1 PT |
| 6,428,490 | B1 * | 8/2002 | Kramer | A61B 5/1071 600/595 |
| 6,445,574 | B1 * | 9/2002 | Saw | H04M 1/0214 349/58 |
| 6,497,051 | B1 * | 12/2002 | Poole | G01B 3/16 33/27.02 |
| 6,567,677 | B1 * | 5/2003 | Sokoloff | G06F 1/1616 348/E7.079 |
| 6,785,935 | B2 * | 9/2004 | Ahn | H04M 1/0216 16/221 |
| 6,848,187 | B2 * | 2/2005 | Ito | G01D 5/2492 33/1 PT |
| 7,028,410 | B2 * | 4/2006 | Sato | G01C 17/30 33/355 R |
| 7,415,173 | B2 * | 8/2008 | Kassamakov | G06F 1/1616 250/231.18 |
| 7,499,101 | B2 * | 3/2009 | Choo | H04M 1/0218 348/333.06 |
| 7,512,426 | B2 * | 3/2009 | Maatta | H04M 1/0218 16/354 |
| 7,610,684 | B2 * | 11/2009 | Steinich | E05D 11/00 33/1 PT |
| 7,958,644 | B2 * | 6/2011 | Boeve | G01C 9/00 33/355 R |
| 8,564,949 | B2 * | 10/2013 | Du | G06F 1/1616 361/679.55 |
| 8,624,844 | B2 * | 1/2014 | Behar | G06F 1/162 345/169 |
| 8,634,183 | B2 * | 1/2014 | Wikander | G06F 1/1681 361/679.01 |
| 8,713,759 | B2 * | 5/2014 | Cai | G06F 1/1681 16/366 |
| 8,773,326 | B2 * | 7/2014 | Yamamoto | G09G 3/342 345/1.3 |
| 8,860,765 | B2 * | 10/2014 | Kilpatrick, II | G06F 1/1616 345/1.1 |
| 8,912,913 | B2 * | 12/2014 | Martins | G06F 1/1613 340/540 |
| 9,013,867 | B2 * | 4/2015 | Becze | G06F 3/1438 361/679.27 |
| 9,144,204 | B2 * | 9/2015 | Redmond | A01G 25/167 |
| 9,229,675 | B2 * | 1/2016 | Becze | G06F 3/1438 |
| 9,348,605 | B2 * | 5/2016 | Drasnin | G06F 9/4415 |
| 9,349,342 | B2 * | 5/2016 | Zhang | G09G 5/00 |
| 9,353,560 | B2 * | 5/2016 | Sprenger | E05D 11/082 |
| 9,366,065 | B2 * | 6/2016 | Ricks | E05D 11/00 |
| 9,405,368 | B2 * | 8/2016 | Modarres | G06F 3/0412 |
| 9,413,931 | B2 * | 8/2016 | Kuromatsu | G06F 1/1677 |
| 9,430,184 | B2 * | 8/2016 | Cho | G06F 1/1652 |
| 9,483,126 | B2 * | 11/2016 | Sprenger | E05D 11/082 |
| 9,524,139 | B2 * | 12/2016 | Aurongzeb | G06F 3/04886 |
| 9,536,140 | B2 * | 1/2017 | Ichikawa | G06F 3/04883 |
| 9,857,848 | B2 * | 1/2018 | Liang | G06F 3/016 |
| 9,904,501 | B2 * | 2/2018 | Becze | G06F 3/1438 |
| 9,915,974 | B2 * | 3/2018 | Yang | G06F 3/1423 |
| 9,927,835 | B2 * | 3/2018 | Behar | G06F 1/162 |
| 9,964,989 | B2 * | 5/2018 | Krivoy | G06F 1/1618 |
| 10,120,421 | B1 * | 11/2018 | Hong | G06F 1/1681 |
| 10,289,154 | B2 * | 5/2019 | Behar | G06F 1/162 |
| 2001/0037581 | A1 * | 11/2001 | Akhavan-Sigari | A61B 5/1071 33/807 |
| 2002/0056750 | A1 * | 5/2002 | Kato | G06K 7/10613 235/454 |
| 2003/0226268 | A1 * | 12/2003 | Gibson | A61B 5/1071 33/281 |
| 2004/0203535 | A1 * | 10/2004 | Kim | H04M 1/021 455/90.3 |
| 2005/0113652 | A1 * | 5/2005 | Stark | A61F 5/0125 600/300 |
| 2006/0264243 | A1 * | 11/2006 | Aarras | G06F 1/1618 455/566 |
| 2007/0041151 | A1 * | 2/2007 | Park | G06F 1/1616 361/679.04 |
| 2007/0180890 | A1 * | 8/2007 | Steinich | E05D 11/00 73/11.01 |
| 2008/0144267 | A1 * | 6/2008 | Tanaka | G06F 1/1622 361/679.06 |
| 2009/0303208 | A1 * | 12/2009 | Case, Jr. | G06F 1/1616 345/204 |
| 2010/0227650 | A1 * | 9/2010 | Kim | G06F 1/1616 455/566 |
| 2011/0157780 | A1 * | 6/2011 | Wang | G06F 1/1681 361/679.01 |
| 2011/0249042 | A1 | 10/2011 | Yamamoto et al. | |
| 2012/0229399 | A1 * | 9/2012 | Kobayashi | G06F 3/0486 345/173 |
| 2013/0023917 | A1 * | 1/2013 | Cruz Hernandez | A61B 17/28 606/174 |
| 2013/0342462 | A1 | 12/2013 | Ashcraft et al. | |
| 2014/0043259 | A1 | 2/2014 | Park | |
| 2014/0306463 | A1 * | 10/2014 | Ho | E05C 19/16 292/251.5 |
| 2014/0320396 | A1 * | 10/2014 | Modarres | G06F 3/0412 345/156 |
| 2014/0373654 | A1 * | 12/2014 | Hsu | G06F 1/1618 74/96 |
| 2015/0309539 | A1 * | 10/2015 | Kamphuis | G06F 1/1681 361/679.27 |
| 2016/0259369 | A1 * | 9/2016 | Sprenger | E05D 11/082 |
| 2016/0378137 | A1 * | 12/2016 | Kwong | G06F 1/1618 345/1.3 |
| 2017/0083092 | A1 * | 3/2017 | Levesque | G06F 3/016 |
| 2018/0188775 | A1 * | 7/2018 | Perelli | G06F 1/1618 |
| 2018/0203475 | A1 * | 7/2018 | Van Derven | G05D 23/1902 |
| 2018/0210515 | A1 * | 7/2018 | Lyles | G06F 1/1616 |
| 2018/0321752 | A1 * | 11/2018 | Levesque | G06F 3/016 |
| 2018/0329461 | A1 * | 11/2018 | Hernandez Santisteban | G06F 1/1681 |
| 2019/0041918 | A1 * | 2/2019 | Larsen | G06F 1/1681 |
| 2019/0131688 | A1 * | 5/2019 | Ramasamy | H01Q 1/2266 |

FOREIGN PATENT DOCUMENTS

| | | |
|---|---|---|
| CN | 103297605 A | 9/2013 |
| TW | I225752 | 12/2004 |
| TW | 201206190 A | 2/2012 |
| TW | 201207618 A | 2/2012 |

OTHER PUBLICATIONS

First Office Action in TW Application No. 104105403, dated Jul. 1, 2016, with English translation, 6 pages.

(56) References Cited

OTHER PUBLICATIONS

Taiwan Notice of Allowance in T.W. Patent Application Serial No. 104105403 dated Oct. 19, 2017, 3 pages with English translation (1 pages).

* cited by examiner

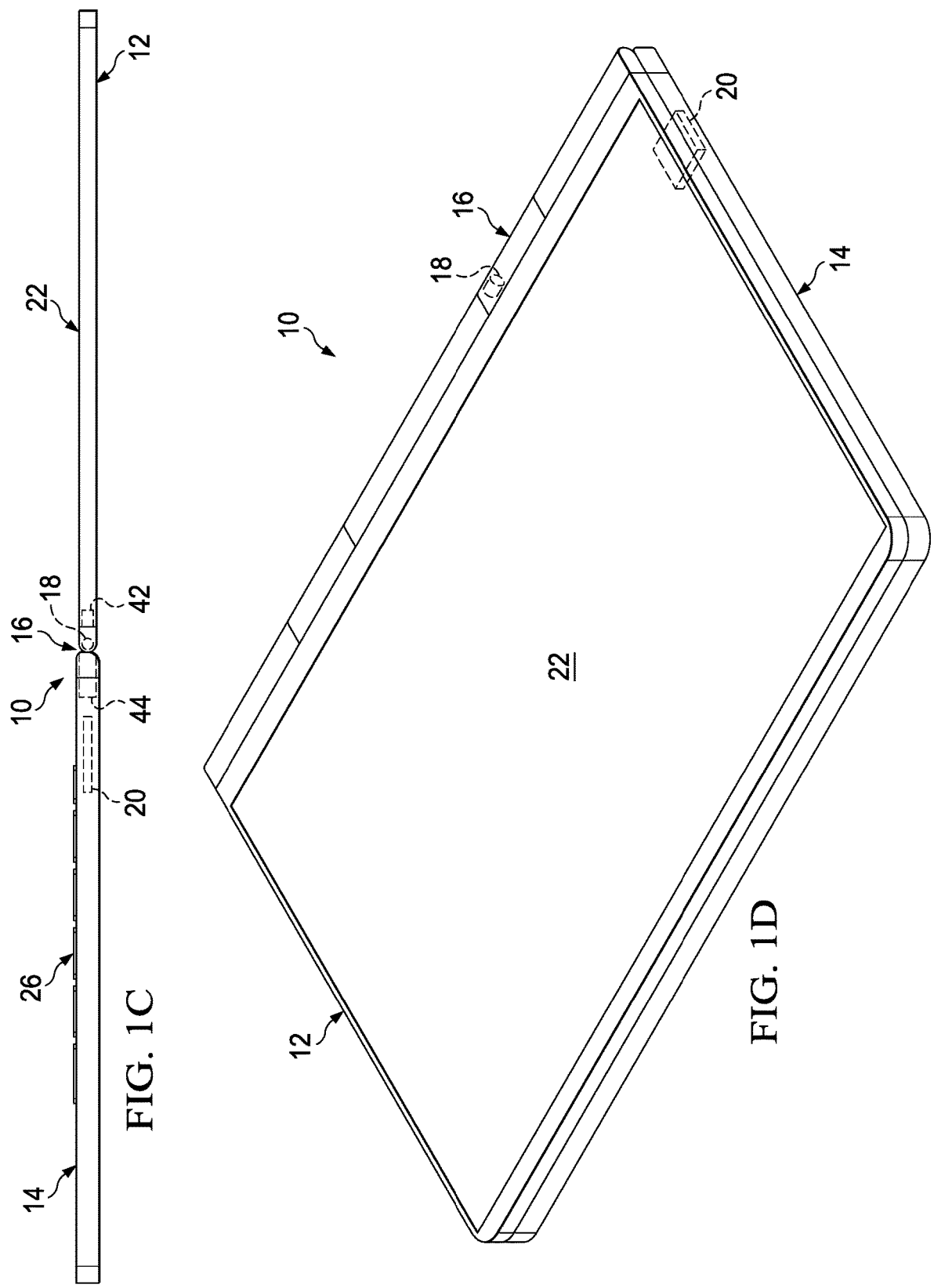

ROTATION SENSOR DEVICE

CROSS-REFERENCE TO RELATED APPLICATION

This Application is a National Stage application under 35 U.S.C. 371 of International Application PCT/CN2014/074251, filed on Mar. 28, 2014 and entitled ROTATION SENSOR DEVICE. The disclosure of the prior application is considered part of and is incorporated by reference in the disclosure of this application.

FIELD OF THE DISCLOSURE

Embodiments described herein generally relate to the field of electronic devices, and more particularly, to a rotation-sensor device.

BACKGROUND

End users have more electronic device choices than ever before. A number of prominent technological trends are currently afoot (e.g., more computing devices, more configurable displays, etc.), and these trends are changing the electronic device landscape. One of the technological trends is a convertible or hybrid computer. The convertible computer is any type of computer system that essentially functions as either a laptop or a tablet computer. Current solutions often rely on a complex rotation detection mechanism to determine the angle of rotation of the display and configure the system based on the angle of rotation. In many instances, these mechanisms can be bulky, complex, expensive, and with significant industrial design implications. Hence, there is a challenge in providing an electronic device that allows the system to determine the rotation of the display that is not bulky, complex, or has significant design implications.

BRIEF DESCRIPTION OF THE DRAWINGS

Embodiments are illustrated by way of example and not by way of limitation in the FIGURES of the accompanying drawings, in which like references indicate similar elements and in which:

FIG. 1C is a simplified orthographic view illustrating an embodiment of an electronic device, in accordance with one embodiment of the present disclosure;

FIG. 1D is a simplified orthographic view illustrating an embodiment of an electronic device, in accordance with one embodiment of the present disclosure;

Figure 1A:
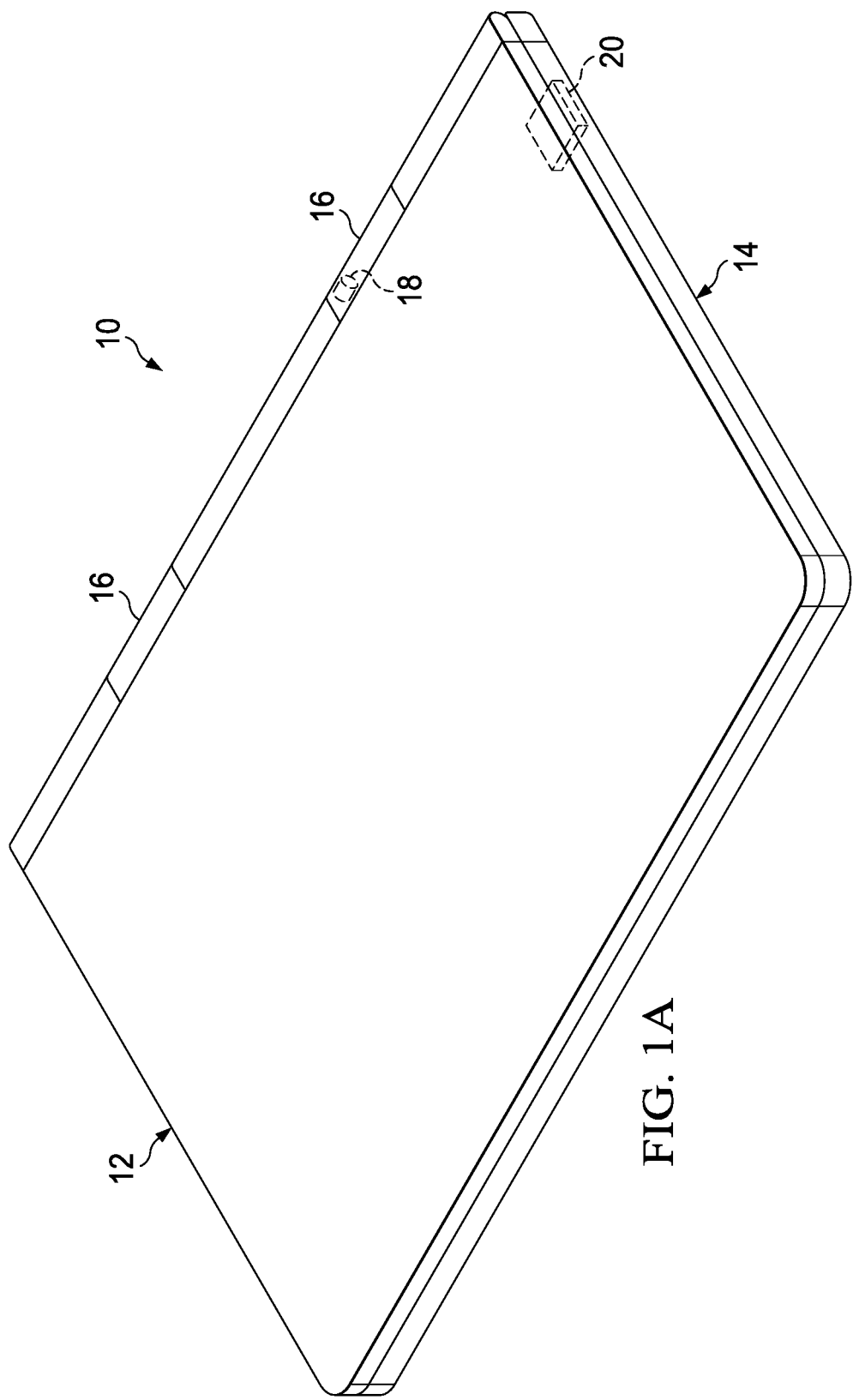
FIG. 1A is a simplified orthographic view illustrating an embodiment of an electronic device, in accordance with one embodiment of the present disclosure.

The FIGURES of the drawings are not necessarily drawn to scale, as their dimensions can be varied considerably without departing from the scope of the present disclosure.

DETAILED DESCRIPTION OF THE EMBODIMENTS

Overview

In an example, there is disclosed a system, an apparatus, and a method for a rotation sensor device. In one example embodiment, a device is provided and includes a hinge to couple a first housing to a second housing. The hinge can include logic to detect a rotation of the first housing around an axis of the hinge, relative to the second housing. The logic may be included in a digital potentiometer integrated within the hinge. The logic can include an inter-integrated circuit.

The device may further include a rotation detection module, where the rotation detection module can receive an angle value signal from the logic and the angle value signal can include an angle value that represents the angle the first housing rotated around the axis of the hinge. In an example, the rotation detection module can determine the configuration of the device based on the angle value. The logic may be integrated into a shaft of the hinge. In addition, the detected rotation of first housing around the axis may be displayed on a display.

Example Embodiments Of The Disclosure

A convertible or hybrid computer is any type of computer system that can essentially function as either a computer or a tablet computer. Typical modern convertible computers have a complex joint between the keyboard housing and the display and a complex rotation detection mechanism to determine the angle of rotation of the display. Typically, the base of a tablet computer attaches to the display at a single joint called a swivel hinge or rotating hinge or through various other hinges, slots, supports, etc. The rotation of the display on the hinge is detected by the rotation detection mechanism to determine the configuration of the convertible computer so the operating system can know the mode or configuration of the convertible computer and set the system to operate appropriately.

Current convertible computer rotation detection mechanisms often rely on sensors and magnets in both of the display portion and the keyboard portion (or base) to do the angle detection. Such a design can be complicated and greatly impact the design of the convertible computer. What is needed is a system and method that allows for a rotation detection mechanism to determine the angle of rotation of the display without sacrificing usability, performance, or cost and does not have significant industrial design implications.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment many have different advantages, and no particular advantage is necessarily required of any embodiment.

In the examples of the present specification, a system and method can be provided that allows for a rotation detection mechanism without sacrificing usability, performance, or cost or having significant industrial design implications. In one example, a hinge is integrated with a sensor device to detect when a first housing rotates from about zero degrees) (0° to about three hundred and sixty degrees)(360° relative to a second housing. The sensor device can share the same shaft with the hinge that connects or couples the first housing with the second housing.

In a specific example, the sensor device may be a digital potentiometer. The potentiometer can detect the angle position or angle value, convert the detected angle value to digital signals, and send the angle value to a rotation detection module (e.g., application processor, sensor hub, platform controller hub (PCH), etc.) in the electronic device. The rotation detection module can use the detected angle value to determine the configuration of the system and set the system to operate in the correct mode or configuration and provide the appropriate user experience. In an example, the detected angle value may be displayed on a display to illustrate the angle of the display.

In an example, the digital potentiometer can detect the angle change of a shaft of the hinge and convert the angle change to digital signals that include the detected angle value. In an embodiment, the digital potentiometer may be bonded with the hinge and have an Inter-Integrated Circuit (12C) interface using 12C signals (e.g., Vcc, 12C_ CLK, 12C_DATA, GND) which are sent to the rotation detection module. The 12C interface can be a multimaster serial single-ended computer bus used for connecting the sensor device to the rotation detection module. The 12C interface may use only two bidirectional open-drain lines, (Serial Data Line (SDA) and Serial Clock (SCL)), pulled up with resistors. Typical voltages used are +5 V or +3.3 V although other voltages may be used.

The sensor device can determine the angle of rotation of the first housing without sacrificing usability, performance, or cost or having significant industrial design implications. Due to its ability to be placed in the hinge, the sensor device can save space for the chassis design and provide a low cost when compared to current solutions. Thus, the sensor device can be relatively easy to implement in the system design, greatly reduce hardware and software complexity, and save chassis space.

Example Embodiments

The following detailed description sets forth example embodiments of apparatuses, methods, and systems relating to detection of display rotation mechanisms or devices for an electronic device. Features such as structure(s), function(s), and/or characteristic(s), for example, are described with reference to one embodiment as a matter of convenience; various embodiments may be implemented with any suitable one or more of the described features.

FIG. 1A is a simplified orthographic view illustrating an embodiment of an electronic device 10 in a closed clamshell configuration in accordance with one embodiment of the present disclosure. Electronic device 10 may include a first housing 12, a second housing 14, and a hinge 16. Hinge 16 may include a sensor device 18. Second housing 14 may include a rotation detection module 20. In an embodiment, first housing 12 or hinge 16 may include rotation detection module 20.

In an embodiment, hinge 16 can include two separate components (as illustrated in FIG. 1A). In other embodiments, hinge 16 may include only one component or more than two components. Hinge 16 can define an axis of rotation (or multiple axes of rotation) that is shared between first housing 12 and second housing 14. Sensor device 18 can share the same shaft with hinge 16. In an embodiment, hinge 16 can include a printed circuit board (PCB) interconnector or some other type of interconnector.

Using hinge 16, electrical current and signals can be passed between first housing 12 and second housing 14 to recharge an on-board battery or capacitor, power any number of items (e.g., display, a wireless module, a camera, speakers, etc.), and provide a communication path between first housing 12 and second housing 14. In other examples, electrical current and signals can be passed through a plug-in connector (e.g., whose male side protrusion connects to first housing 12 and whose female side connects to second housing 14 or vice-versa) or a wireless connector (e.g., Wi-Fi, Bluetooth, etc.). Note that any number of connectors (e.g., Universal Serial Bus (USB) connectors (e.g., in compliance with the USB 3.0 Specification released in November 2008), Thunderbolt198 connectors, a non-standard connection point such as a docking connector, etc.) can be provisioned in conjunction with electronic device 10. [Thunderbolt198 and the Thunderbolt logo are trademarks of Intel Corporation in the U.S. and/or other countries.]. Virtually any other electrical connection methods could be used and, thus, are clearly within the scope of the present disclosure. In one or more embodiments, electronic device 10 may be any suitable electronic device having a display such as a mobile device, a tablet computer and/or a tablet device (e.g., iPad), a personal digital assistant (PDA), a smartphone, an audio system, a movie player of any type, a computer docking station, etc.

In an embodiment, an electronic device (e.g., electronic device 10) can be configured to use a sensor device (e.g., sensor device 18) to detect the angle position of a first housing (e.g., first housing 12) relative to a second housing (e.g. second housing 14), convert the angle value to digital signals, and send the angle value to an application processor (e.g., rotation detection module 20) in the electronic device. The application processor can use the angle value, determine the configuration of electronic device 10, and set the system (e.g., operating system) of electronic device 10 to operate in the correct mode or configuration and to provide the appropriate user experience.

Figure 1B:
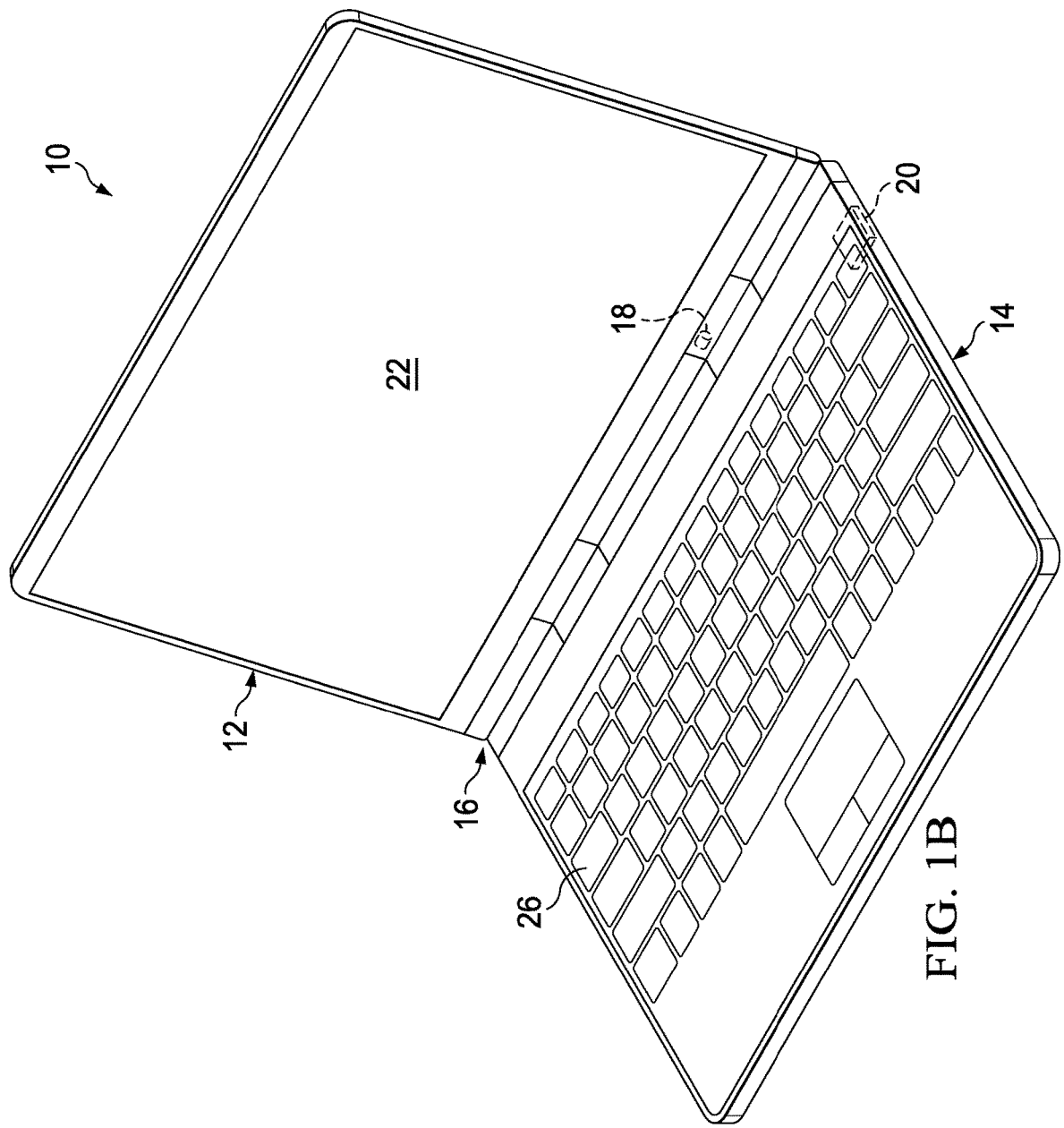
FIG. 1B is a simplified orthographic view illustrating an embodiment of an electronic device, in accordance with one embodiment of the present disclosure.

Turning to FIG. 1B, FIG. 1B is a simplified orthographic view illustrating electronic device 10 in an open clamshell configuration, in accordance with one embodiment of the present disclosure. Second housing 14 may include an input device 26 (e.g., a mechanical keyboard or a touch screen keyboard). First housing 12 may include a display 22.

Display 22 may be a liquid crystal display (LCD), organic light-emitting diode (OLED), or some other type of display. Electronic device 10 can include a battery and various electronics (e.g., wireless module (e.g., Wi-Fi module, Bluetooth module, etc.) processor, memory, camera, a microphone, speakers, etc.).

In one or more embodiments, second housing 14 can function as an input device and may include a mechanical keyboard, touch screen, input area, etc. The touch screen can detect the presence and location of a touch within the touch screen area. In one example, the touch screen can be configured to allow for the input of letters, numbers, characters, functions, etc. similar to a mechanical keyboard and the touch screen may be used in place of (or instead of) a mechanical keyboard. In another example, the touch screen may supplement a mechanical keyboard and may be configured to operate as a number key pad, design area, function call, or some other similar input area.

As illustrated in FIG. 1B, first housing 12 has been rotated on hinge 16. Sensor device 18 can detect the rotation of first housing 12 relative to the second housing and send an angle value to rotation detection module 20. Rotation detection module 20 can receive the angle value, determine the configuration of electronic device 10, and set the system to operate in the correct mode or configuration. For example, sensor device 18 may detect that first housing 12 has rotated to an angle of one hundred degrees)(100° on hinge 16. Sensor device 18 can send an angle value of 100° to rotation detection module 20 and rotation detection module 20 can determine that electronic device 10 is in an open clamshell configuration. The operating system of electronic device 10 can then configure electronic device 10 to operate in an open clamshell configuration.

Turning to FIG. 1C, FIG. 1C is a simplified orthographic view illustrating electronic device 10 in a flat configuration in accordance with one embodiment of the present disclosure. As illustrated in FIG. 1C, first housing 12 has been rotated on hinge 16 to the flat configuration. Hinge 16 can include a first housing attachment 42 that extends into and couples hinge 16 to first housing 12 and a second housing attachment 44 that extends into and couples hinge 16 to second housing 14. Sensor device 18 can detect the rotation and send the angle value to rotation detection module 20. Rotation detection module 20 can receive the angle value, determine the configuration of electronic device 10, and set the system (e.g., operating system) of electronic device 10 to operate in the correct mode or configuration. For example, sensor device 18 may detect that first housing 12 has rotated to an angle of one hundred and eighty degrees)(180° on hinge 16. Sensor device 18 can send an angle value of 180° to rotation detection module 20 and rotation detection module 20 can determine that electronic device 10 is in a flat configuration. The operating system of electronic device 10 can then configure electronic device 10 to operate in a flat configuration.

Turning to FIG. 1D, FIG. 1D is a simplified orthographic view illustrating electronic device 10 in a tablet configuration in accordance with one embodiment of the present disclosure. As illustrated in FIG. 1D, first housing 12 has been rotated on hinge 16 to a tablet configuration. Sensor device 18 can detect the rotation and send the angle value to rotation detection module 20. Rotation detection module 20 can receive the angle value, determine the configuration of electronic device 10, and set the system (e.g., operating system) of electronic device 10 to operate in the correct mode or configuration. For example, sensor device 18 may detect that first housing 12 has rotated to an angle of 360° on hinge 16. Sensor device 18 can send an angle value of 360° to rotation detection module 20 and rotation detection module 20 can determine that electronic device 10 is in a tablet configuration. The operating system of electronic device 10 can then configure electronic device 10 to operate in a tablet configuration.

The following information may be viewed as a basis from which one or more embodiments may be explained. Although the embodiments described are related to convertible computers, tablets, laptops, hybrid laptops, etc. there may be other embodiments that deal with phone, PDAs, audio systems, etc.

A convertible computer, (e.g., a hybrid laptop, 2:1Ultrabooks, etc.) is a mobile computer that can include a clamshell or laptop configuration and a tablet configuration. To convert from the clamshell configuration to the tablet configuration, often the tablet or display (e.g., first housing 12) can be rotated around the base or keyboard (e.g., second housing 14). While convertible computers are a compelling way of delivering convertibility from a clamshell configuration to a tablet configuration, in some designs, the rotation detection mechanism can be complicated and greatly impact the design of the convertible computer and can provide a negative user experience. Rotation detection mechanisms for convertible computers can be challenging to design and current convertible computer rotation detection mechanisms often rely on sensors and magnets in both of the first housing and the second housing to do the angle detection. Such a design can be complicated and greatly impact the industrial design of the convertible computer.

In an embodiment, an electronic device can be configured with a sensor device that can mitigate against bulky, complex, expensive, and significant industrial design implications without compromising the user experience. In a specific implementation, the sensor device may be a digital potentiometer. The potentiometer can detect the angle position or angle value, convert the angle value to a digital signal, and send the angle value to a rotation detection module (e.g., application processor, sensor hub, platform controller hub (PCH), etc.) in the electronic device. The rotation detection module can use the angle value to determine the configuration of the system and set the system to operate in the correct mode or configuration and provide the appropriate user experience.

Note that any of the hinge or sensor device configurations, examples, or embodiment discussed herein may be of any appropriate shape and dimensions, where its construction could reflect an integral piece (e.g., of plastic, metal, fiber, any combination of these, etc.) or its construction could reflect a number of components being fit together. The hinge and sensor device could have various sub-parts (e.g., two sub-parts on either end of the second housing or the first housing). The components could be hidden from sight, or exposed. In certain implementations, the sensor device could be located almost anywhere in the electronic device that would allow the sensor device to detect the rotation of the first housing. It is imperative to note that any such alternatives and permutations are clearly within the broad scope of the present disclosure.

Figure 2:
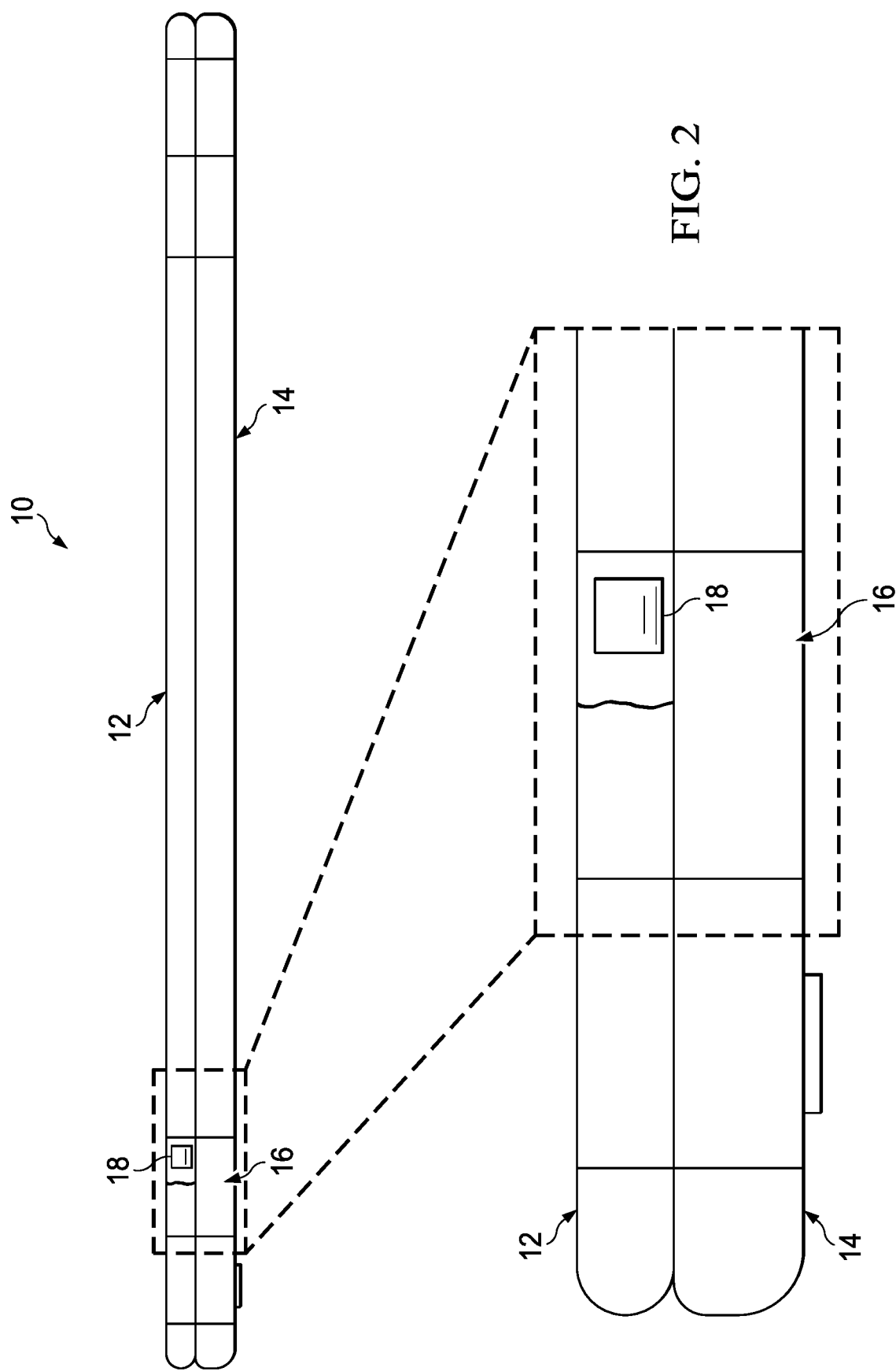
FIG. 2 is a simplified block diagram illustrating an embodiment of a portion of an electronic device, in accordance with one embodiment of the present disclosure.

Turning to FIG. 2, FIG. 2 is a simplified orthographic view illustrating electronic device 10 in accordance with one embodiment of the present disclosure. As illustrated in FIG. 2, when hinge 16 is two separate segments, only one segment may include sensor device 18. In another embodiment, each segment may include a sensor device 18. Sensor device 18 may be located anywhere in hinge 16 that will allow sensor device 18 to detect the rotation of first housing 12.

Figure 3:
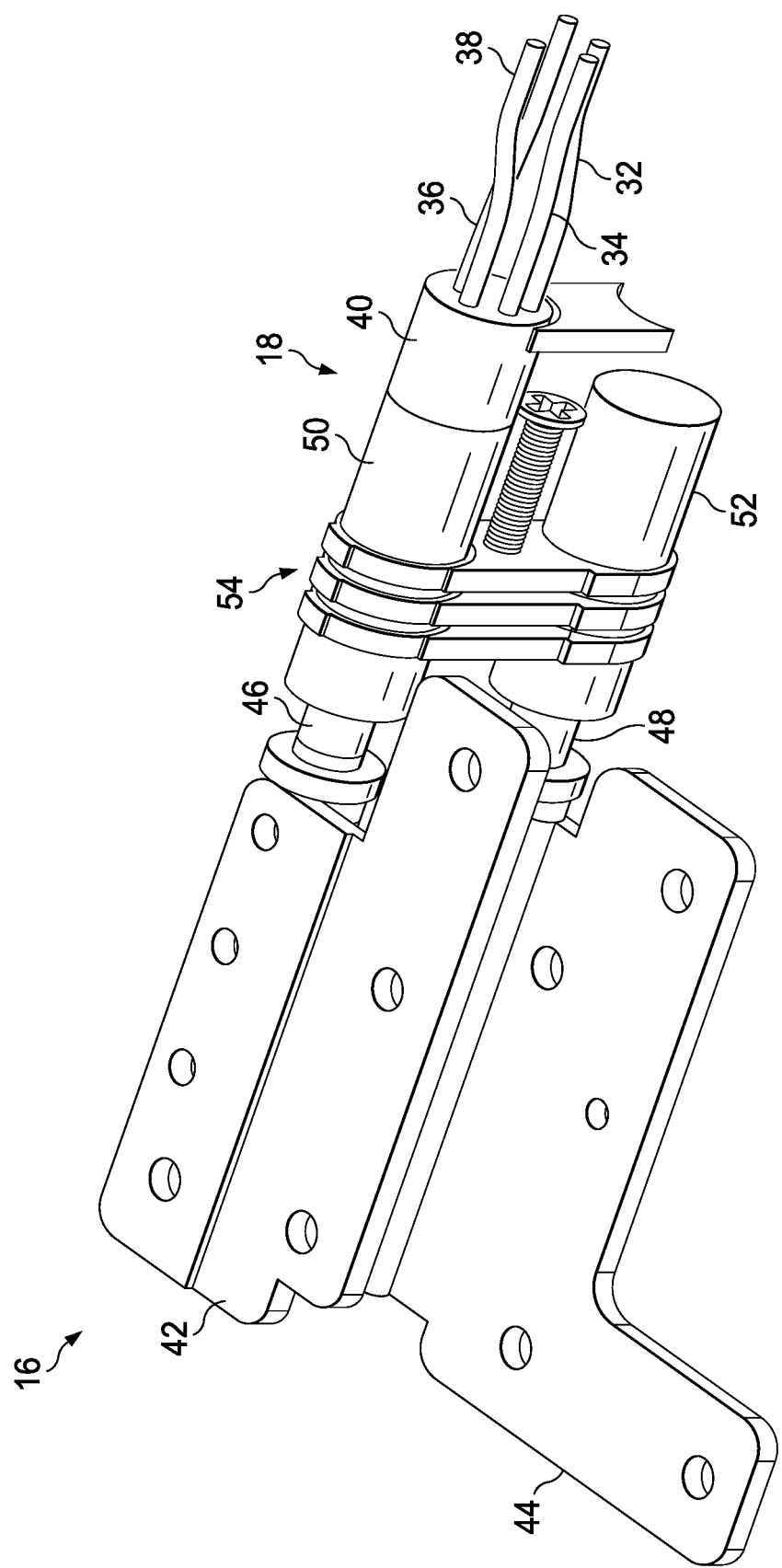
FIG. 3 is a simplified orthographic view illustrating an embodiment of a portion of an electronic device, in accordance with one embodiment of the present disclosure.

Turning to FIG. 3, FIG. 3 is a simplified orthographic view illustrating hinge 16 and sensor device 18 in accordance with one embodiment of the present disclosure. Hinge 16 can include first housing attachment 42, second housing attachment 44, a first housing attachment shaft 46, a second housing attachment shaft 48, a first housing rotation arm 50, and a second housing rotation arm 52. First housing rotation arm 50 and second housing rotation arm 52 can be rotationally coupled together using rotation arm link 54. Sensor device 18 can include a digital potentiometer 40. Sensor device 18 can be integrated with hinge 16 to detect an angle change of hinge 16. More specifically, as illustrated in FIG. 3, sensor device 18 can be coupled to first housing attachment shaft 46 adn can detect an angle change of first housing attachment shaft 46.

Digital potentiometer 40 can include a Vcc pin 32, a CLK pin 34, a DATA pin 36, and a ground pin 38. Vcc pin 32 can provide positive supply voltage and ground pin 38 can supply negative voltage or act as a ground. CLK pin 34 can provide a system clock and may be an inter-integrated circuit (12C) clock pin. DATA pin 36 can be a data pin for data transfer such as angle values and may be an 12C data pin.

Generally, a digital potentiometer (also referred to as a digipot) is a digitally controlled electronic component that mimics the analog functions of a potentiometer. Through digital input signals, the resistance between two terminals can be measured, just as in an analog potentiometer. In the illustrative example, the resistance between Vcc pin 32 and ground pin 38 can be measured and converted to an angle value. The angle value can be sent on DAT pin 36 to rotation detection module 20, where the configuration of electronic device 10 can be determined. While sensor device 18 is illustrated as including a digital potentiometer, sensor device 18 may include any device that is capable of detecting the rotation of first housing 12 (e.g., biased magnet and sensor chip, etc.).

Figure 4:
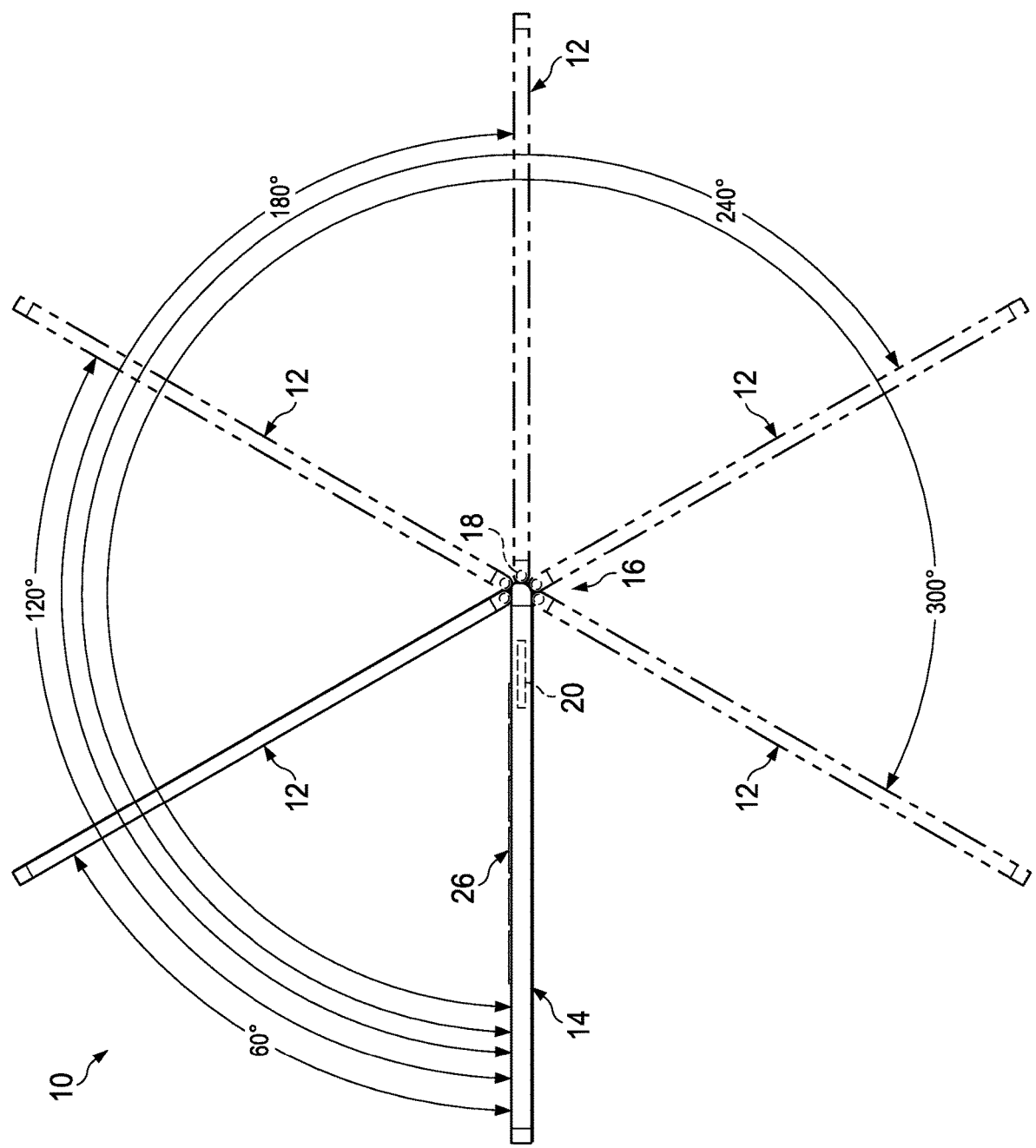
FIG. 4 is a simplified block diagram illustrating an embodiment of an electronic device, in accordance with one embodiment of the present disclosure.

Turning to FIG. 4, FIG. 4 is a simplified orthographic view illustrating an electronic device 10 in accordance with one embodiment of the present disclosure. Hinge 16 can define an axis of rotation that is shared between first housing 12 and second housing 14 and allow first housing 12 to rotate on an axis relative to second housing 14. For example, first housing may rotate around second housing 14 about 360°. In an illustrative example, the 360° rotation may be broken up into six different configurations. In other examples, the rotation may be less than 360° or may be broken up into any number of different configurations.

For example, about zero (0) to about sixty degrees)(60° may be designated as a closed laptop configuration. About 60° to about one hundred and twenty degrees)(120° may be designated as an open clamshell configuration. About 120° to about one hundred and eighty degrees)(180° may be designed as an open flat configuration. About 180° to about two-hundred and forty degrees)(240° may be designated as a movie mode configuration. About 240° to about three hundred degrees)(300° may be designated as a transitioning tablet configuration. About 300° to about 360° may be designated as a tablet configuration.

Sensor device 18 can detect the approximate angle of rotation and send the data to rotation detection module 20. Rotation detection module 20 can receive the data and determine the configuration of electronic device 10. Based on the configuration of electronic device 10, different systems, processes, elements, etc. can be activated or deactivated. For example, when electronic device 10 is determined to be in a movie mode configuration, a transitioning tablet configuration, or a tablet configuration, keyboard 26 may be turned off or only certain keys on keyboard 26 may be operational.

Figure 5:
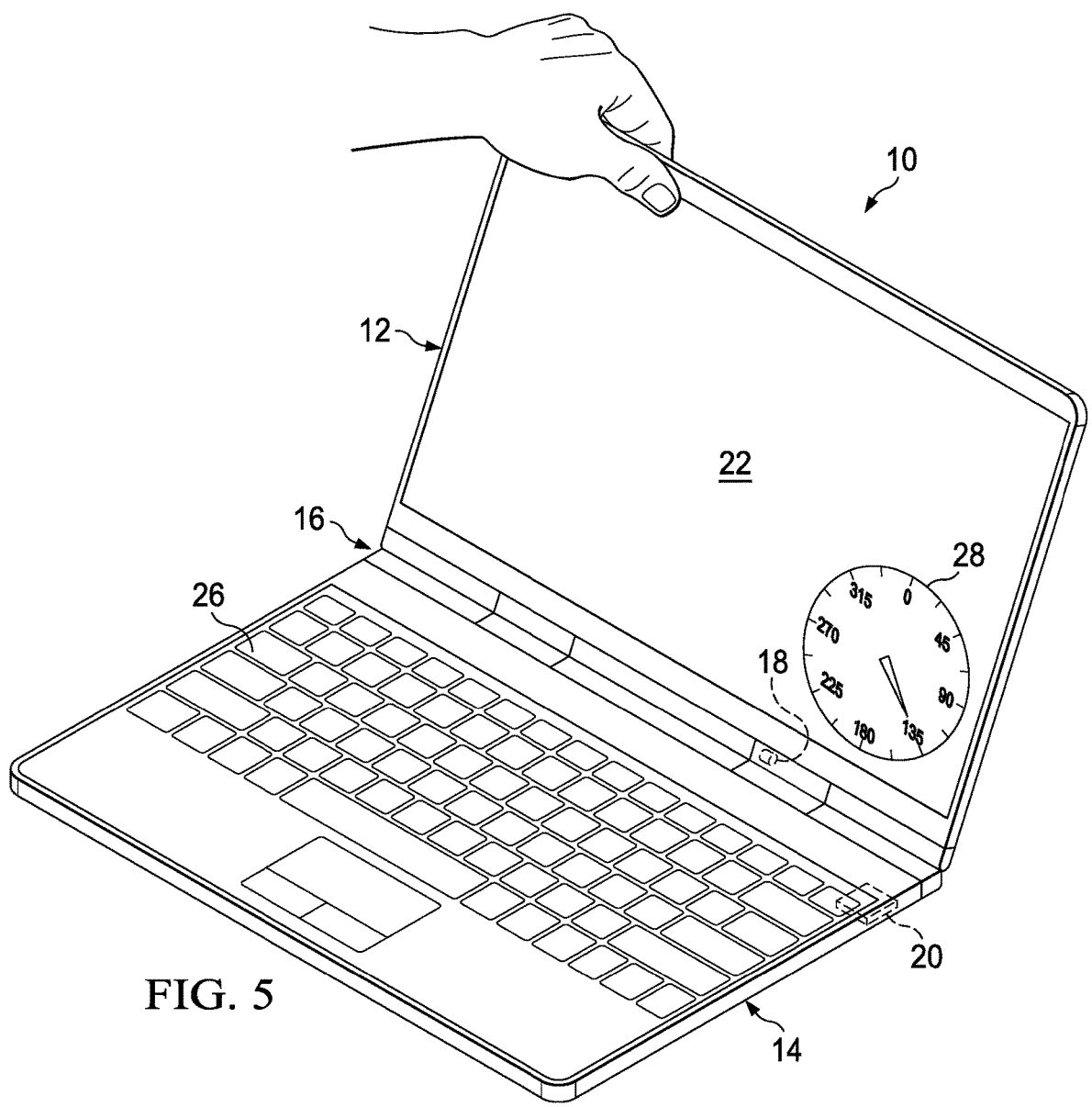
FIG. 5 is a simplified orthographic view illustrating an embodiment of an electronic device, in accordance with one embodiment of the present disclosure.

Turning to FIG. 5, FIG. 5 is a simplified orthographic view illustrating a portion of electronic device 10 in accordance with one embodiment of the present disclosure. As illustrated in FIG. 5, hinge 16 can include a display rotation indicator 28. Display rotation indicator 28 can provide a visual indication of the display rotation determined by sensor device 18. For example, sensor device 18 may determine that first housing 12 has rotated about one hundred and thirty five degrees)(135° on hinge 16. Sensor device 18 can send the angle value to rotation detection module 20. Rotation detection module 20 can send a signal that causes the number "135" to be displayed on display rotation indicator 28.

Note that the embodiments of FIGS. 1A-5 are simply reflective of one of the many possible design choices for electronic device 10. In other cases, the location, shape, and size of hinge 16, sensor device 18, and rotation detection module 20 may be varied considerably. For example, in certain cases, the length of hinge 16 may occupy the entire length of one side of first housing's 12 and second housing's 14 framework. In other cases, sensor device 18 may be located someplace else on hinge 16 other than where illustrated in the figures.

Figure 6:
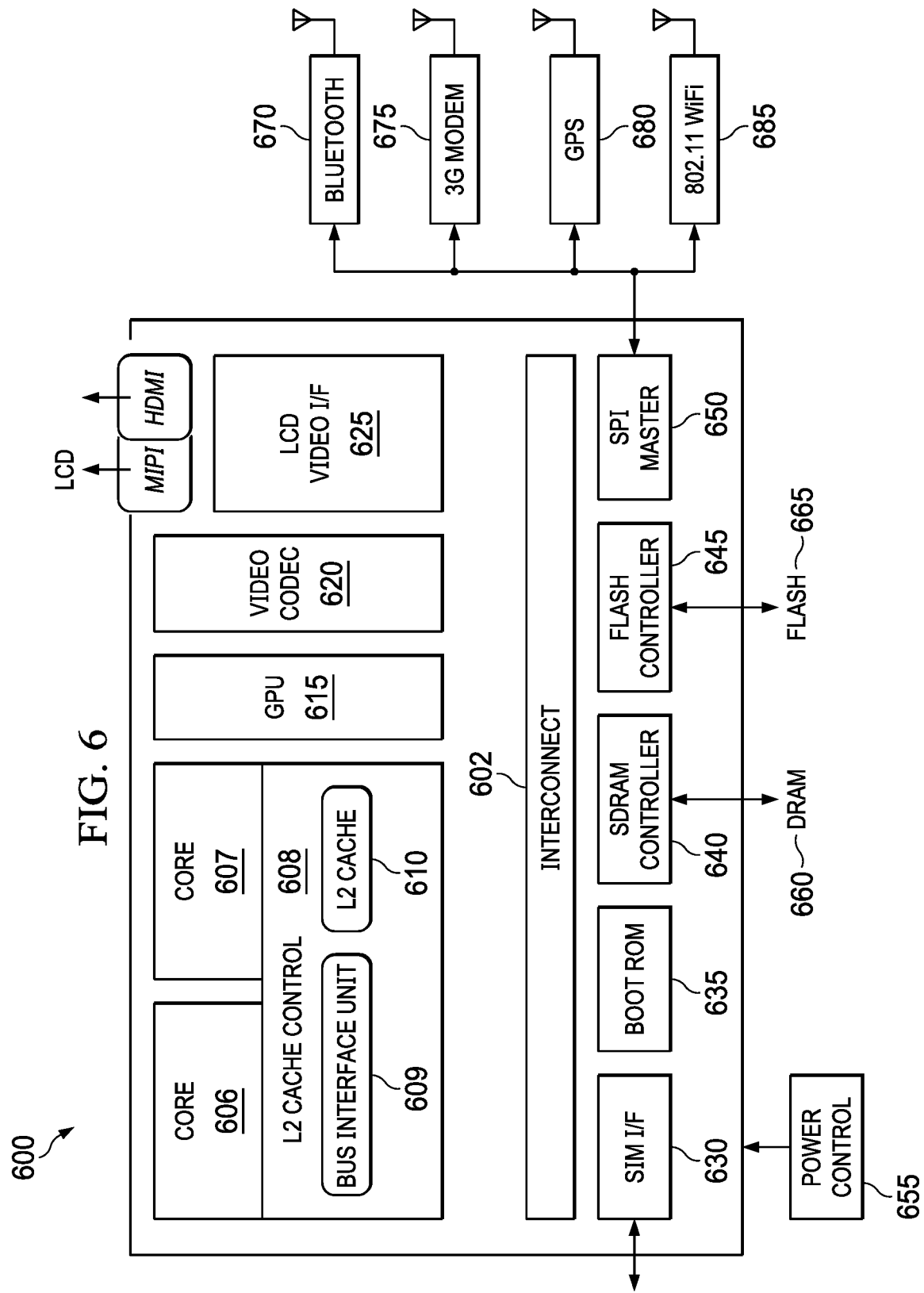
FIG. 6 is a simplified block diagram associated with an example ARM ecosystem system on chip (SOC) of the present disclosure.

Turning to FIG. 6, FIG. 6 is a simplified block diagram associated with an example ARM ecosystem SOC 600 of the present disclosure. At least one example implementation of the present disclosure can include the rotation detection features discussed herein and an ARM component. For example, the example of FIG. 6 can be associated with any ARM core (e.g., A-9, A-15, etc.). Further, the architecture can be part of any type of tablet, smartphone (inclusive of Android™phones, iPhones™, iPad™Google Nexus™, Microsoft Surface™, personal computer, server, video processing components, laptop computer (inclusive of any type of notebook), Ultrabook™system, any type of touch-enabled input device, etc.

In this example of FIG. 6, ARM ecosystem SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LCD.

ARM ecosystem SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more example embodiment include one or more communication capabilities, interfaces, and features such as instances of Bluetooth™670, a 3G modem 675, a global positioning system (GPS) 680, and an 802.11Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™Adobe™Flash-™Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 7:
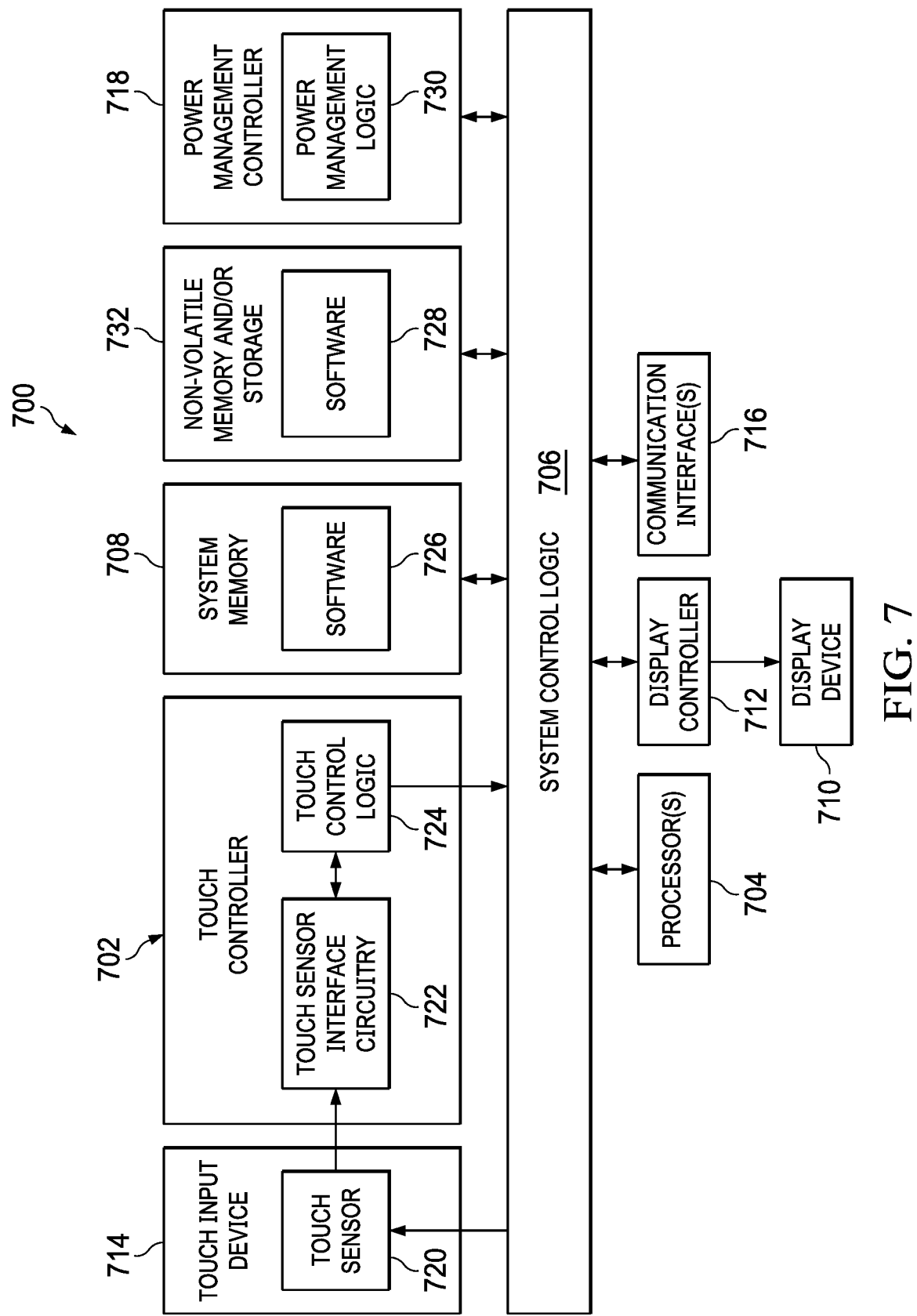
FIG. 7 is a simplified block diagram illustrating example logic that may be used to execute activities associated with the present disclosure.

Turning to FIG. 7, FIG. 7 is a simplified block diagram illustrating potential electronics and logic that may be associated with electronic device 10 discussed herein. In at least one example embodiment, system 700 can include a touch controller 702, one or more processors 704, system control logic 706 coupled to at least one of processor(s) 704, system memory 708 coupled to system control logic 706, non-volatile memory and/or storage device(s) 732 coupled to system control logic 706, display controller 712 coupled to system control logic 706, display controller 712 coupled to a display device 710, power management controller 718 coupled to system control logic 706, and/or communication interfaces 716 coupled to system control logic 706.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 700 is part of a more generalized enclosure. In alternate implementations, instead of notebook device/laptops, etc., certain alternate embodiments deal with mobile phones, tablet devices, etc.

System control logic 706, in at least one embodiment, can include any suitable interface controllers to provide for any suitable interface to at least one processor 704 and/or to any suitable device or component in communication with system control logic 706. System control logic 706, in at least one embodiment, can include one or more memory controllers to provide an interface to system memory 708. System memory 708 may be used to load and store data and/or instructions, for example, for system 700. System memory 708, in at least one embodiment, can include any suitable volatile memory, such as suitable dynamic random access memory (DRAM) for example. System control logic 706, in at least one embodiment, can include one or more I/O controllers to provide an interface to display device 710, touch controller 702, and non-volatile memory and/or storage device(s) 732.

Non-volatile memory and/or storage device(s) 732 may be used to store data and/or instructions, for example within software 728. Non-volatile memory and/or storage device(s) 732 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 718 may include power management logic 730 configured to control various power management and/or power saving functions. In at least one example embodiment, power management controller 718 is configured to reduce the power consumption of components or devices of system 700 that may either be operated at reduced power or turned off when the electronic device is in a closed configuration. For example, in at least one embodiment, when the electronic device is in a closed configuration, power management controller 718 performs one or more of the following: power down the unused portion of the display and/or any backlight associated therewith; allow one or more of processor(s) 704 to go to a lower power state if less computing power is required in the closed configuration; and shutdown any devices and/or components that are unused when an electronic device is in the closed configuration.

Communications interface(s) 716 may provide an interface for system 700 to communicate over one or more networks and/or with any other suitable device. Communications interface(s) 716 may include any suitable hardware and/or firmware. Communications interface(s) 716, in at least one example embodiment, may include, for example, a network adapter, a wireless network adapter, a telephone modem, and/or a wireless modem. System control logic 706, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 704 may be packaged together with logic for one or more controllers of system control logic 706. In at least one embodiment, at least one processor 704 may be packaged together with logic for one or more controllers of system control logic 706 to form a System in Package (SiP). In at least one embodiment, at least one processor 704 may be integrated on the same die with logic for one or more controllers of system control logic 706. For at least one embodiment, at least one processor 704 may be integrated on the same die with logic for one or more controllers of system control logic 706 to form a System on Chip (SoC).

For touch control, touch controller 702 may include touch sensor interface circuitry 722 and touch control logic 724. Touch sensor interface circuitry 722 may be coupled to detect, using a touch sensor 720, touch input over a first touch surface layer and a second touch surface layer of a display (i.e., display device 710). Touch sensor interface circuitry 722 may include any suitable circuitry that may depend, for example, at least in part on the touch-sensitive technology used for a touch input device 714. Touch sensor interface circuitry 722, in one embodiment, may support any suitable multi-touch technology. Touch sensor interface circuitry 722, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 724 may be coupled to help control touch sensor interface circuitry 722 in any suitable manner to detect touch input over a first touch surface layer and a second touch surface layer. Touch control logic 724 for at least one example embodiment may also be coupled to output in any suitable manner digital touch input data corresponding to touch input detected by touch sensor interface circuitry 722. Touch control logic 724 may be implemented using any suitable logic, including any suitable hardware, firmware, and/or software logic (e.g., non-transitory tangible media), that may depend, for example, at least in part on the circuitry used for touch sensor interface circuitry 722. Touch control logic 724 for at least one embodiment may support any suitable multi-touch technology.

Touch control logic 724 may be coupled to output digital touch input data to system control logic 706 and/or at least one processor 704 for processing. At least one processor 704 for at least one embodiment may execute any suitable software to process digital touch input data output from touch control logic 724. Suitable software may include, for example, any suitable driver software and/or any suitable application software. As illustrated in FIG. 7, system memory 708 may store suitable software 726 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., specific commands, timing intervals, supporting ancillary components, angles, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35U.S.C. section 112as it exists on the date of the filing hereof unless the words "means for" or "step for" are specifically used in the particular claims; and (b) does not intend, by any statement in the Specification, to limit this disclosure in any way that is not otherwise reflected in the appended claims.

Example Embodiment Implementations

One particular example implementation of an electronic device may include activities associated with the detection of rotation for a device. The sensor device allows for the rotation detection to be relatively simple without sacrificing usability, performance, or cost or having significant industrial design implications. The sensor device can be a digital potentiometer included in a hinge that couples or connects a first housing and a second housing. In an example, the sensor device can include an inter-integrated circuit. In another example, a rotation detection module can receive an angle value signal from the sensor device. The angle value signal can include an angle value that represents an angle the first housing has rotated on the hinge relative to the second housing. The rotation detection module can determine the configuration of the electronic device based on the angle value in the angle value signal. The sensor device can be integrated into a shaft of the hinge. In another example implementation, the detected rotation of the first housing can be displayed on a display.

Other Notes And Examples

Example A1 is a device that includes a hinge to couple a first housing to a second housing, the hinge including logic to detect a rotation of the first housing around an axis of the hinge relative to the second housing.

In Example A2, the subject matter of Example A1 may optionally include where the logic is included in a digital potentiometer integrated within the hinge.

In Example A3, the subject matter of any of the preceding 'A' Examples can optionally include where the logic includes an inter-integrated circuit.

In Example A4, the subject matter of any of the preceding 'A' Examples can optionally include a rotation detection module, where the rotation detection module can receive an angle value signal from the logic. The angle value signal can include an angle value that represents an angle the first housing rotated around the axis of the hinge.

In Example A5, the subject matter of any of the preceding 'A' Examples can optionally include where the rotation detection module can determine the configuration of the device based on the angle value in the angle value signal.

In Example A6, the subject matter of any of the preceding 'A' Examples can optionally include where the logic is integrated into a shaft of the hinge.

In Example A7, the subject matter of any of the preceding 'A' Examples can optionally include where the detected rotation of the first housing is displayed on a display.

Example AA1 can include an convertible computer that includes a first housing, a second housing, a hinge to couple the first housing to the second housing, and a sensor device located in the hinge, where the sensor device is configured to detect a rotation of the first housing around an axis of the hinge relative to the second housing.

In Example AA2, the subject matter of any of the preceding 'AA' Examples can optionally include where the sensor device is a digital potentiometer and includes an inter-integrated circuit.

In Example AA3, the subject matter of any of the preceding 'AA' Examples can optionally include a rotation detection module, where the rotation detection module can receive an angle value signal from the sensor device. The angle value signal can include an angle value that represents an angle the first housing has rotated around the axis of the hinge.

In Example AA4, the subject matter of any of the preceding 'AA' Examples can optionally include where the rotation detection module can determine a configuration of the convertible computer based on the angle value in the angle value signal.

In Example AA5, the subject matter of any of the preceding 'AA' Examples can optionally include where the sensor device is integrated into a shaft of the hinge.

In Example AA6, the subject matter of any of the preceding 'AA' Examples can optionally include where the detected rotation of the first housing is displayed on a display.

Example C1 is one or more computer readable medium having instructions stored thereon, the instructions, when executed by a processor, cause the processor to determine an angle of rotation of a first housing around an axis of a hinge relative to a second housing using logic, wherein the logic is integrated in the hinge.

In Example C2, the subject matter of any of the preceding 'M' Examples can optionally include where the logic is included a digital potentiometer.

In Example C3, the subject matter of any of the preceding 'M' Examples can optionally include where the logic includes an inter-integrated circuit.

In Example C4, the subject matter of any of the preceding 'M' Examples can optionally include further instructions that, when executed by the processor, cause the processor to send an angle value signal to a rotation detection module, where the angle value signal includes an angle value that represents the determined angle of rotation.

In Example C5, the subject matter of any of the preceding 'M' Examples can optionally include further instructions that, when executed by the processor, cause the processor to determine a configuration of an electronic device using the angle value.

In Example C6, the subject matter of any of the preceding 'M' Examples can optionally include further instructions that, when executed by the processor, cause the processor to display the detected rotation of the first housing on a display.

An example system S1 can include means for determining an angle of rotation of a first housing on a hinge using a sensor device, wherein the sensor device is integrated in the hinge.

An example system SS1 can include a hinge to couple a first housing to a second housing and logic located in the hinge to detect a rotation of the first housing around an axis of the hinge relative to the second housing.

In Example SS2, the subject matter of any of the preceding 'SS' Examples can optionally include where the logic is included in a digital potentiometer.

In Example SS3, the subject matter of any of the preceding 'SS' Examples can optionally include where the logic includes an inter-integrated circuit.

In Example SS4, the subject matter of any of the preceding 'SS' Examples can optionally include a rotation detection module, where the rotation detection module can receive an angle value signal from the logic. The angle value signal can include an angle value that represents an angle the first housing has rotated around the axis.

In Example SS5, the subject matter of any of the preceding 'SS' Examples can optionally include where the rotation detection module can determine the configuration of an electronic device that includes the first housing and the second housing based on the angle value signal.

In Example SS6, the subject matter of any of the preceding 'SS' Examples can optionally include where the logic is integrated into a shaft of the hinge.

Example X1 is a machine-readable storage medium including machine-readable instructions to implement a method or realize an apparatus as in any one of the Examples A1-A8, AA1-AA6, C1-C6, S1, and SS1-SS6. Example Y1 is an apparatus comprising means for performing of any of the example methods. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
    a hinge to couple a first housing to a second housing, wherein the first housing includes a display and the hinge allows the first housing to rotate from about zero degrees(0°) to about three hundred and sixty degrees (360°) relative to the second housing, the hinge including:
        a first housing attachment that couples the hinge to the first housing;
        a second housing attachment that couples the hinge to the second housing;
        a first housing rotation arm coupled to the first housing attachment;
        a second housing rotation arm coupled to the second housing attachment; and
        a rotation arm link that rotationally couples the first housing rotation arm to the second housing rotation arm; and
        a sensor integrated in the first housing rotation arm to detect an angle change of the hinge and convert the angle change to digital signals that include a detected angle value.

2. The electronic device of claim 1, wherein the sensor is a digital potentiometer.

3. The electronic device of claim 2, further comprising:
    logic to receive a signal from the sensor and determine a rotation of the first housing relative to the second housing, wherein the logic includes an inter-integrated circuit.

4. The electronic device of claim 1, further comprising:
    logic to receive a signal from the sensor and determine a rotation of the first housing relative to the second housing; and
    a rotation detection module, wherein the rotation detection module can receive an angle value signal from the logic, wherein the angle value signal includes an angle value that represents an angle the first housing rotated around an axis of the hinge.

5. The electronic device of claim 4, wherein the rotation detection module can determine a configuration of the electronic device based on the angle value in the angle value signal.

6. The electronic device of claim 5, wherein the detected angle value is displayed on the display.

7. The electronic device of claim 1, wherein the sensor and logic to receive a signal from the sensor and determine a rotation of the first housing relative to the second housing are included in a digital potentiometer integrated into the the first housing rotation arm, wherein the digital potentiometer has an Inter-Integrated Circuit interface.

8. The electronic device of claim 1, wherein the sensor converts the angle change to digital signals that include a detected angle value.

9. A convertible computer, comprising:
    a first housing;
    a second housing;
    a hinge to couple the first housing to the second housing, wherein the hinge includes:
        a first housing attachment that couples the hinge to the first housing;
        a second housing attachment that couples the hinge to the second housing;
        a first housing rotation arm coupled to the first housing attachment;
        a second housing rotation arm coupled to the second housing attachment; and
        a rotation arm link that rotationally couples the first housing rotation arm to the second housing rotation arm, wherein the first housing rotates from about zero degrees (0°) to about three hundred and sixty degrees (360°) relative to the second housing; and a sensor device coupled to the first housing rotation arm, wherein the sensor device is configured to detect an angle change of the hinge and convert the angle change to digital signals that include a detected angle value, wherein the angle change can be used to determine a rotation of the first housing around an axis of the hinge, relative to the second housing.

10. The convertible computer of claim 9, wherein the sensor device is a digital potentiometer and includes an inter-integrated circuit.

11. The convertible computer of claim 9, further comprising:
a rotation detection module, wherein the rotation detection module can receive the detected angle value from the sensor device, wherein the detected angle value includes an angle value that represents an angle the first housing rotated around the axis of the hinge.

12. The convertible computer of claim 11, wherein the rotation detection module can determine a configuration of the convertible computer based on the angle value.

13. The convertible computer of claim 9, wherein the sensor device is integrated into the first housing rotation arm.

14. The convertible computer of claim 9, wherein the detected angle value is displayed on a display.

15. One or more non-transitory computer readable medium having instructions stored thereon, the instructions, when executed by a processor, cause the processor to:
determine, relative to a second housing, an angle of rotation of a first housing around an axis of a hinge using logic, wherein the logic is integrated in the hinge, wherein the hinge couples the first housing to the second housing, wherein the first housing rotates from about zero degrees (0°) to about three hundred and sixty degrees (360°) relative to the second housing, wherein the hinge includes:
a first housing attachment that couples the hinge to the first housing;
a second housing attachment that couples the hinge to the second housing;
a first housing rotation arm coupled to the first housing attachment;
a second housing rotation arm coupled to the second housing attachment;
a rotation arm link that rotationally couples the first housing rotation arm to the second housing rotation arm;
a sensor to detect an angle change of the hinge and convert the angle change to digital signals that include a detected angle value; and
the logic to receive a signal from the sensor and determine a rotation of the first housing around an axis of the hinge, relative to the second housing.

16. The one or more non-transitory computer readable medium of claim 15, wherein the logic is included in a digital potentiometer.

17. The one or more non-transitory computer readable medium of claim 15, further including instructions that, when executed by the processor, cause the processor to:
send an angle value signal to a rotation detection module, wherein the angle value signal includes an angle value that represents the detected angle change of the hinge.

18. The one or more non-transitory computer readable medium of claim 17, further including instructions that, when executed by the processor, cause the processor to:
determine a configuration of an electronic device using the angle value.

19. The one or more non-transitory computer readable medium of claim 15, further including instructions that, when executed by the processor, cause the processor to:
display the determined rotation of the first housing on a display.

20. A system, comprising:
a hinge to couple a first housing to a second housing, wherein the first housing rotates from about zero degrees (0°) to about three hundred and sixty degrees (360°) relative to the second housing, wherein the hinge includes:
a first housing attachment that couples the hinge to the first housing;
a second housing attachment that couples the hinge to the second housing;
a first housing rotation arm coupled to the first housing attachment;
a second housing rotation arm coupled to the second housing attachment;
a rotation arm link that rotationally couples the first housing rotation arm to the second housing rotation arm; and
a sensor located in the first housing rotation arm to detect an angle change of a shaft of the hinge and convert the angle change to digital signals that include a detected angle value; and
logic to receive a signal from the sensor and determine a rotation of the first housing around an axis of the hinge, relative to the second housing.

21. The system of claim 20, wherein the sensor and logic are included in a digital potentiometer.

22. The system of claim 20, wherein the logic includes an inter-integrated circuit.

23. The system of claim 20, further comprising:
a rotation detection module, wherein the rotation detection module can receive an angle value signal from the logic, wherein the angle value signal includes an angle value that represents an angle the first housing has rotated around the axis of the hinge.

24. The system of claim 23, wherein the rotation detection module can determine a configuration of an electronic device that includes the first housing and the second housing based on the angle value signal.

25. The system of claim 20, wherein the logic is integrated into the first housing rotation arm.

* * * * *

UNITED STATES PATENT AND TRADEMARK OFFICE
CERTIFICATE OF CORRECTION

PATENT NO. : 10,571,972 B2
APPLICATION NO. : 15/119222
DATED : February 25, 2020
INVENTOR(S) : Bao Shao et al.

Page 1 of 1

It is certified that error appears in the above-identified patent and that said Letters Patent is hereby corrected as shown below:

In the Claims

In Column 14, Lines 44, in Claim 7, delete "the the" and insert -- the --, therefor.

Signed and Sealed this
Second Day of June, 2020

Andrei Iancu
*Director of the United States Patent and Trademark Office*